UNITED STATES PATENT OFFICE.

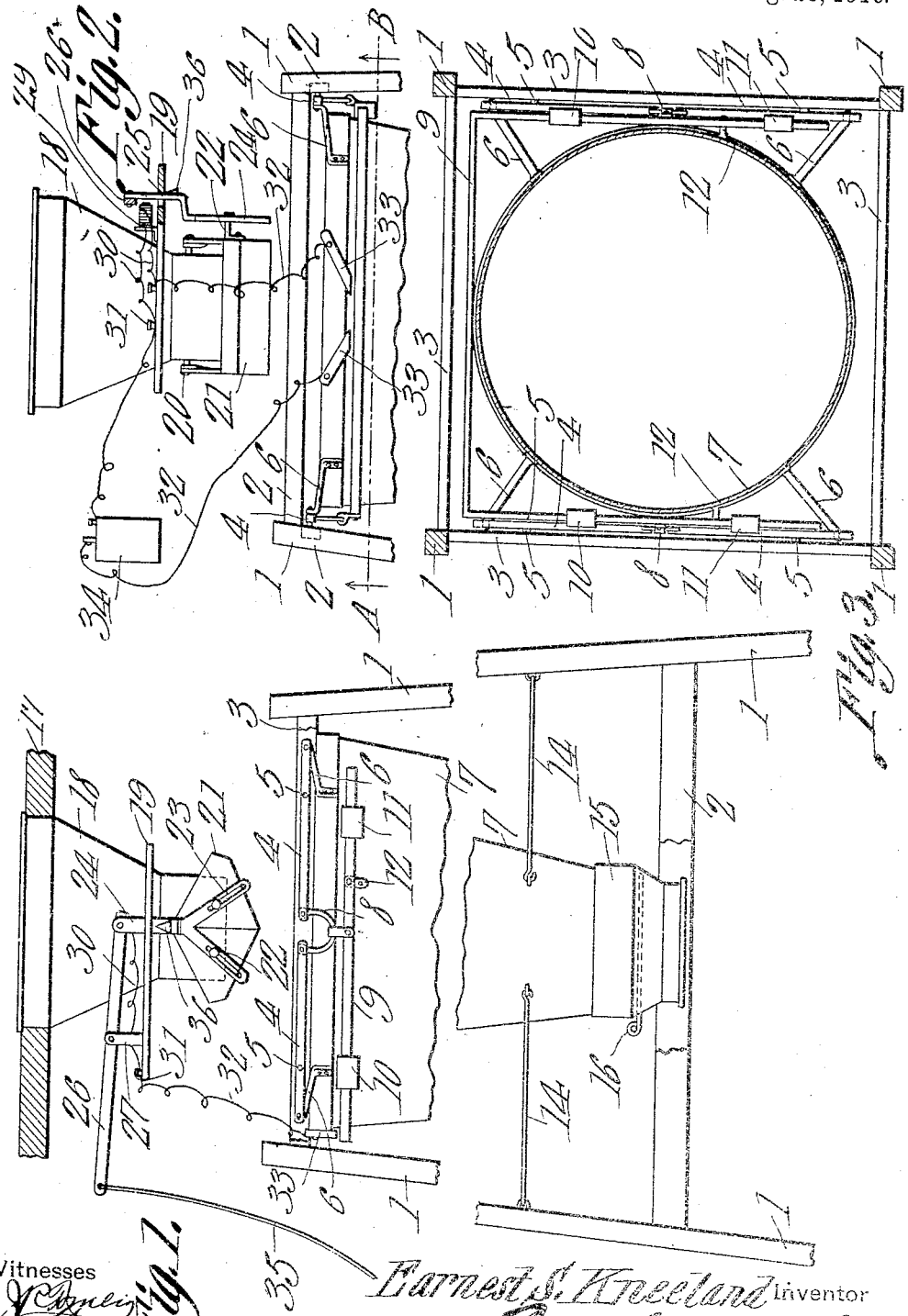

EARNEST S. KNEELAND, OF MALDEN, MASSACHUSETTS.

WEIGHING DEVICE.

967,935.

Specification of Letters Patent.

Patented Aug. 23, 1910.

Application filed May 11, 1910. Serial No. 560,651.

*To all whom it may concern:*

Be it known that I, EARNEST S. KNEELAND, a citizen of the United States, residing at Malden, in the county of Middlesex and State of Massachusetts, have invented a new and useful Weighing Device, of which the following is a specification.

It is the object of this invention to provide a weighing device adapted to control accurately, and to cut off at a predetermined weight, grain and the like, as the same flows from a hopper into a receptacle.

Another object of the invention is to provide an electrically controlled member adapted to be manipulated manually to open the hopper, the said member being operated electrically, when a predetermined amount of grain has passed from the hopper, to close the hopper.

Another object of the invention is to provide weight indicating mechanism of novel and improved form.

Another object of the invention is to provide novel means for opening and closing the hopper.

The drawings show typical embodiments merely, and it is to be understood that changes, properly falling within the scope of what is claimed, may be made, without departing from the spirit of the invention.

In the drawings, Figure 1 is a fragmental side elevation, parts being broken away and shown in section; Fig. 2 is a fragmental side elevation, the device being viewed at right angles to the showing of Fig. 1 and parts being broken away and shown in section; and Fig. 3 is a transverse section of the device along the line A—B of Fig. 2.

The supporting frame upon which the structure is mounted may be of any form; in the present instance diverging legs 1 are shown, united in their intermediate portions by cross braces 2, and likewise united, adjacent their upper ends by frame members 3. Oppositely disposed frame members 3 are provided with duplicate mechanisms, one of which will be described specifically it being understood that the description applies with equal propriety to the other of said mechanisms. Levers 4 are fulcrumed at 5, intermediate their ends upon one of the frame members 3. Suitable connecting devices 6, unite pivotally the remote ends of the levers 4 with the upper portion of a receiver, the same being shown in the form of a conical spout 7. The adjacent ends of the levers 4 are connected with the intermediate portion of a scale beam 9 by a link and eye mechanism 8.

The scale beam 9, hereinafter referred to as the movable weight indicating member, is U-shaped, to extend partially around the receiver 7. Adjacent its ends, the scale beam 9 is pivotally connected, as at 12, with the receiver 7. Weights 10 are slidable upon the scale beam 9 to one side of the connections 8 and 12 and other weights 11 are slidable upon the scale beam to the other side of the connections 8 and 12 and adjacent the ends of the scale beam. The weights 10 serve to indicate the weight of the contents of the receiver 7 while the members 11 may be manipulated to act counter to the weights 10, thereby to compensate in the well known manner, for the falling grain which is between the bottom of the receiver 7 and the closure members 21 when the latter come together to cut off the grain. Thus, if the weights 10 are set at 100 pounds, and the weights 11 are set at zero, a trial charge may be run into the receiver 7. This trial charge when removed from the receiver 7 and weighed, will weigh more than 100 pounds, say 107 pounds, the seven pounds representing the grain which was falling at the time the beam 9 tilted to close the parts 21. If the weights 11 are then set to the seven pound mark, the subsequent charges will weigh 100 pounds even. The lower end of the receiver 7 is provided with a ring 15 in which a slide 16 is mounted to shut off the outflow from the receiver, ties 14 serving to steady the receiver 7 between the legs of one of the supporting frames.

Into a receiver, constructed as above pointed out, or in any other suitable manner, a hopper 18 is positioned to discharge, the hopper being sustained in the floor 17 of the grain bin. Secured to the hopper 18 is a platform 19, the hopper and the platform being referred to hereinafter under the general designation of a receptacle. Pivoted at 20 to the hopper 18, adjacent their upper ends, are a pair of coöperating closure members 21. These closure members 21 are adapted to swing beneath the hopper 18, to close the same. Lugs 22 outstand from the closure members 21 at one end thereof, and these lugs are adapted to register slidably in the slots 23, located in the diverging arms of a Y-shaped, resilient latch 24. In the platform 19 there is an opening 25 adapted to receive the shank of the latch lever and in this opening the latch lever is mounted for vertical reciprocation. The intermediate portion of a lever 26 is fulcrumed upon a standard 27, rising from the platform 19, one end of the lever 26 being pivotally united with the upper end of the latch 24. For the manipulation of the lever 26, a cord 35 or the like may be connected therewith. Upon the outer face of the latch 24 there is a projection 36, adapted to engage with the upper face of the platform 19 adjacent the opening 25 in which the latch moves. Disposed upon the platform 19 between the latch 24 and the hopper 18, is an electromagnet 29. Wires 30 extend from the electromagnet to binding posts 31 located upon the platform 19. From these binding posts 31, other wires 32 extend to fingers 33, pivotally supported above the scale beam 9, and located upon the receiver 7 adjacent the upper end thereof. Interposed in the electrical conductors uniting the fingers 33 with the magnet 29, is a battery 34. This battery 34 may be supported in any desired manner, and located at any desired distance from the mechanism hereinbefore described.

The operation of the device is as follows; presupposing that the parts are positioned as shown in Fig. 1. The slidable member 10 is adjusted upon the scale beam 9 to indicate the desired weight. The cord 35 is then drawn upon, tilting the lever 26, and causing the latch 24 to move upwardly through the opening 25 in the platform 19. This upward movement of the latch 24 will cause the lugs 22 to slide in the slots 23 of the latch, the closure members 21 being thus swung apart to uncover the lower end of the hopper 18. As the latch 24 is thus lifted, the projection 36 thereon will pass upwardly through the opening 25 in the platform 19, and engage the platform, holding the closure members 21 in an open position. From the hopper 18 the grain will flow downwardly into the receiver 7, resting upon the slide 16 therein. The grain will accumulate in the receiver until the weight of the grain therein is sufficient to tilt the scale beam 9 upwardly, raising the weight 10. As the scale beam thus moves upwardly, the beam will contact with the pivotally mounted fingers 32 thus completing the circuit through the wires 30 and 32 energizing the electromagnet 29. The free upper end of the latch 24 will be drawn toward the hopper 18, alining the projection 36 vertically with the opening 35, whereupon the closure members 21 will swing into the closed position shown in Fig. 1, thus cutting off the flow of grain from the hopper 18 into the receiver 7. At this point it may profitably be stated that the lever 26 is loosely mounted in the standard 27 so that the latch 24 may move sufficiently to disengage the projection 36 from the platform 19.

Having thus described the invention, what is claimed is:—

1. In a device of the class described, a receptacle; a pivoted closure therefor; a latch connected with the closure; a fixed support with which the latch is adapted to engage yieldingly to hold the closure in an open position; means for manipulating the latch to move the closure into an open position; an electromagnet positioned to draw the latch out of engagement with the fixed support; a receiver into which the receptacle is positioned to discharge; a movable member to indicate the weight of the contents of the receiver; and separate electrical conductors connected with the magnet; the weight indicating member being movable under the weight of the contents of the receiver to complete the circuit through the conductors.

2. In a device of the class described, a receptacle; a closure pivoted thereto; a latch slidably connected with the closure to open and to close the same, the latch being yieldably engageable by the receptacle to hold the closure in an open position; a lever supported upon the receptacle and operatively connected with the latch to move the closure into an open position; an electromagnet supported upon the receptacle and positioned to break the engagement between the latch and the receptacle; a receiver into which the receptacle is positioned to discharge; a movable member to indicate the weight of the contents of the receiver; and separate electrical conductors connected with the magnet; the weight indicating member being movable under the contents of the receiver to complete the circuit through the conductors.

3. In a device of the class described, a hopper; a platform connected with the hopper; a pivotally mounted two part closure for the hopper; a latch slidably mounted in the platform and having diverging arms slidably connected with the parts of the closure, the latch and the platform having interengaging elements to hold the closure parts in open position; means for manipulating the latch to move the closure parts into open position; an electromagnet supported adjacent the latch and operating upon the same to break the engagement between the interengaging elements of the latch and the platform; a receiver into which the receptacle is positioned to discharge; a movable member to indicate the weight of the contents of the receiver; and separate, electrical conductors connected with the magnet; the weight indicating member being movable under the weight of the contents of the receiver to complete the circuit through the conductors.

4. In a device of the class described, a hopper; a platform secured thereto; a two part closure pivotally connected with the hopper; a latch slidable in the platform and having diverging arms slidably connected with the closure parts to open and to close the same, the latch and the platform being provided with interengaging elements to hold the closure parts in open position; a lever fulcrumed intermediate its ends upon the platform and pivotally connected with the latch; an electromagnet positioned upon the platform and operable to break the hold of the interengaging elements upon each other; means for receiving the contents of the hopper; a device upon said means for indicating the weight of the material deposited from the hopper; and a connection between the weighing device and the electromagnet, operable to energize the latter when a predetermined weight has passed from the hopper.

In testimony that I claim the foregoing as my own, I have hereto affixed my signature in the presence of two witnesses.

EARNEST S. KNEELAND.

Witnesses:
ELLA M. HYDE,
CHAS. E. DENNETT.